United States Patent
Hackl et al.

[11] Patent Number: 6,085,860
[45] Date of Patent: Jul. 11, 2000

[54] METHOD AND APPARATUS FOR OPERATING A STEERING SYSTEM FOR A MOTOR VEHICLE

[75] Inventors: Matthias Hackl; Wolfgang Kraemer, both of Stuttgart, Germany

[73] Assignee: Robert Bosch GmbH, Stuttgart, Germany

[21] Appl. No.: 09/045,438

[22] Filed: Mar. 20, 1998

[30] Foreign Application Priority Data

Mar. 22, 1997 [DE] Germany ............................ 197 12 165
Nov. 19, 1997 [DE] Germany ............................ 197 51 227

[51] Int. Cl.$^7$ ............................................ B62D 5/04
[52] U.S. Cl. ..................... 180/443; 180/197; 303/146; 701/41
[58] Field of Search ...................... 180/446, 443, 180/422; 303/146, 147; 701/41, 48

[56] References Cited

U.S. PATENT DOCUMENTS

| | | | |
|---|---|---|---|
| 3,831,701 | 8/1974 | Pilon et al. ........................ | 180/79.2 R |
| 4,998,593 | 3/1991 | Karnopp et al. .................... | 180/140 |
| 5,035,295 | 7/1991 | Leiber et al. ...................... | 180/140 |
| 5,089,967 | 2/1992 | Haseda et al. ..................... | 364/426.02 |
| 5,205,371 | 4/1993 | Karnopp ........................... | 180/79.1 |
| 5,227,974 | 7/1993 | Tomoda et al. .................... | 364/424.05 |
| 5,228,757 | 7/1993 | Ito et al. .......................... | 303/100 |
| 5,229,955 | 7/1993 | Nishiwaki et al. ................. | 364/550 |
| 5,316,379 | 5/1994 | Becker et al. ..................... | 303/100 |
| 5,428,532 | 6/1995 | Yasuno ............................. | 364/424.05 |
| 5,732,371 | 3/1998 | Fujita .............................. | 701/38 |
| 5,732,379 | 3/1998 | Eckert et al. ..................... | 701/83 |
| 5,742,919 | 4/1998 | Ashrafi et al. .................... | 701/70 |
| 5,790,966 | 8/1998 | Madau et al. ...................... | 701/41 |
| 5,809,444 | 9/1998 | Hadeler et al. .................... | 701/72 |
| 5,832,402 | 11/1998 | Brachert et al. ................... | 701/72 |

FOREIGN PATENT DOCUMENTS 3 625 392 of 0000 Germany.

OTHER PUBLICATIONS

Jürgen Ackermann, Tilman Bünte, Wolfgang Sienel, Holger Jeebe, and Karl Naab, "Fahrisicherheit Durch Robuste Lenkregelung." Automatisierungstechnik, vol. 44, May, 1996, pp. 219–225.

*Primary Examiner*—Paul N. Dickson
*Assistant Examiner*—Daniel Yeagley
*Attorney, Agent, or Firm*—Baker & Daniels

[57] ABSTRACT

A steering system for a motor vehicle with at least one steerable wheel, one actuator, and one auxiliary drive. The auxiliary drive superimposes the steering motion initiated by the driver of the vehicle and the motion initiated by the actuator to generate the steering motion of the steerable wheel. A yaw parameter representing the yawing motion of the vehicle is detected, and a control signal is calculated when a predetermined running condition prevails, dependent at least on the detected yaw parameter. The actuator is then controlled by the generated control signal to initiate the motion. A braking parameter representing the braking condition of the vehicle is also detected, and the existence of the running condition is determined dependent on this detected braking parameter whereby yaw behavior is improved. Active steering intervention is switched in only when an external disturbance of vehicle motion is detected.

11 Claims, 6 Drawing Sheets

METHOD AND APPARATUS FOR OPERATING A STEERING SYSTEM FOR A MOTOR VEHICLE

BACKGROUND OF THE INVENTION

This invention relates to a method and an apparatus for operating a steering system for a motor vehicle.

Such a steering system is disclosed by DE-OS 40 31 316 (corresponds to U.S. Pat. No. 5,205,371), and to the extent that it is relevant to understanding this invention, is to be explained by reference to FIGS. 1 and 2. In such a steering system, the motions of the actuator 13 or 23, the motor angle $\delta_M$, are superimposed in the auxiliary drive 12 or 22 on the steering motions imparted by the driver through the steering wheel 11 or 21, the steering wheel angle $\delta_L$ detected by the sensor 28. The total motion $\delta_L'$ obtained in this way is transmitted through the steering mechanism 14 and the steering linkage 16 to the steerable wheels 15a and 15b to set the steering angle $\delta_V$. The actuator 13 or 23 can be an electric motor. The operating principle of such a steering system consists of the motor angle $\delta_M$ being determined to control the dynamic behavior of the vehicle depending on the steering wheel angle $\delta_L$ and depending on signals Sm, with the steering wheel angle $\delta_L$ being determined by the sensor 28 and the signals Sm representing vehicle motions detected by the sensors 26. The total steering angle is found from the equation $$\delta_L' = \delta_L / i_{\ddot{u}} + \delta_M$$

in which the transmission ratio can be $i_{\ddot{u}}=1$ or $i_{\ddot{u}}\approx 1$.

DE A1 36 25 392 shows the emission of a correction signal to a servomotor that controls the front wheel steering angle. The correction signal depends on a desired-actual yaw rate difference.

GB-PS 1,414,206 shows the compensation of crosswind effects by a superimposed steering angle intervention.

DE-OS 40 38 079 (corresponding to U.S. Pat. No. 5,316,379) shows the superimposition of a steering component (compensating steering angle) at the front wheel and/or rear wheel. The compensating steering angle, which depends on the differences in brake pressure, compensates for the yaw motion with so-called $\mu$-split brakes, i.e. with brakes in which the road frictions differ significantly on the right and left sides of the roadway. However, there can be the problem in this case that the difference in brake pressures represents only an inaccurate measure of the yaw moment, which can be severely distorted in particular by different left and right tires, fading, nonuniform brake wear, antilock system malfunction, or brake system failure.

In the paper by Ackermann et al.: "Driving Safety From Rugged Steering Regulation", Automatisierungtechnik 44 (1996) 5, pages 219 to 225, it is suggested that the yaw dynamics of a motor vehicle be controlled by steering intervention, with the particular proposal of an integral-control unit.

Although an integrating yaw rate controller with high amplification is particularly suitable for controlling major problems, for example those that occur with $\mu$-split antilock brakes or strong crosswind, such a controller on the other hand frequently causes steering interventions that are unnecessary and disturbing in case of small problems, for example such as slightly washboarded roads.

The purpose of this invention consists of improving the yaw behavior of a vehicle by steering interventions, but without bringing about unnecessarily frequent steering interventions.

SUMMARY OF THE INVENTION

As already mentioned, the invention issues from a steering system for a motor vehicle with at least one steerable wheel, one actuator, and one auxiliary drive. The steering motion initiated by the driver of the vehicle and the motion initiated by the actuator are superimposed by the auxiliary drive to generate the steering motion of the steerable wheel. According to the invention, a yaw parameter representing the yawing motion of the vehicle is detected and a control signal is calculated when a predetermined running condition arises, that depends at least on this detected yaw parameter. The actuator is then controlled by the generated control signal to initiate the motion. Also according to the invention, a braking parameter representing the braking condition of the vehicle is calculated and the existence of the running condition dependent on this braking condition is determined.

The invention makes possible active steering intervention to improve yaw behavior, which intervenes only when an external disturbance of vehicle motion is detected.

In particular it is provided that the detected braking parameter represents a braking condition of the vehicle in which a braking process is taking place on a roadway with significantly different coefficients of road friction on the different sides of the vehicle. It is particularly provided that the detected braking parameter is detected dependent on the braking actions, especially dependent on the wheel brake pressures, of at least two wheel brakes on different sides of the vehicle. The detected braking parameter can be detected dependent on the difference between the wheel brake pressures of at least two wheel brakes on different sides of the vehicle and/or dependent on the ratio of the larger to the smaller of the wheel brake pressures ($p_{vr}$, $p_{vl}$) of at least two wheel brakes on different sides of the vehicle. It can also be provided that the detected braking parameter is detected dependent on actuation of the brake system, in particular dependent on actuation of the brake lights.

As already mentioned, a yaw moment is induced with such so-called $\mu$-split brakes that is to be counteracted by active steering intervention. In contrast to systems, for example such as those described in the initially mentioned DE-OS 40 38 079 (corresponding to U.S. Pat. No. 5,316,379), the invention also intervenes correctly in the steering in case of nonuniform brake lining wear, fading, different tires on the right and left, antilock brake malfunctions, or brake system failure, and counteracts the yawing motion, increasing driving safety.

A beneficial refinement of the invention provides that a desired value for the yawing motion of the vehicle is determined. This desired value in particular is determined dependent on the steering motion initiated by the driver of the vehicle and/or dependent on the detected vehicle speed. The control signal is then calculated dependent at least on the difference between the detected yaw value and the determined desired value.

It is particularly beneficial for the detected yaw value or the difference between the detected yaw value and the determined desired value to be integrated (integral-control unit) to calculate the control signal. As already described, an integrating yaw rate controller with high amplification is especially suitable for controlling major problems such as those that occur with $\mu$-split antilock brakes or strong crosswind. The problem that such a controller frequently causes steering interventions that are unnecessary and disturbing in case of small problems such as slightly washboarded roads, is solved by the invention. Thus, an integral-control unit with high amplification is found that intervenes only in the case of predetermined major problems.

It is also advantageous, after the existence of the predetermined running condition, when this running condition no longer prevails, for the control signal or at least the portion of the control signal calculated dependent on the yaw value, to lead to a predetermined value with a curve falling with time, especially to the value of zero. The curve falling with time in this case can be accomplished on a linear slope or by first-order time-delay behavior. In particular, the curve falling with time can depend on the vehicle speed. In accordance with this refinement of the invention, the added steering angle reverts to zero when there is no further external disturbance.

Improved detection of external disturbances is achieved by providing that the detected braking parameter also depends on the steering motion initiated by the driver of the vehicle and the vehicle speed and/or on a value representing the transverse acceleration of the vehicle. In this variant, in case of $\mu$-split detection, the steering angle and the vehicle speed or the transverse acceleration are additionally considered to be able better to differentiate between $\mu$-split braking and curve braking.

Since crosswind can also lead to undesirable yawing motion of the vehicle, it is also beneficial for a crosswind value representing an effect of crosswind on the vehicle to be detected, and for the existence of a running condition also to depend on the detected crosswind value.

BRIEF DESCRIPTION OF THE DRAWINGS

FIG. 5 shows a yaw rate control, while

DESCRIPTION OF THE PREFERRED EMBODIMENT

The invention will be described below with reference to an example of an embodiment of the invention. The starting point by way of example is a prior art embodiment of superimposed steering as set forth hereinabove.

Figure 1:
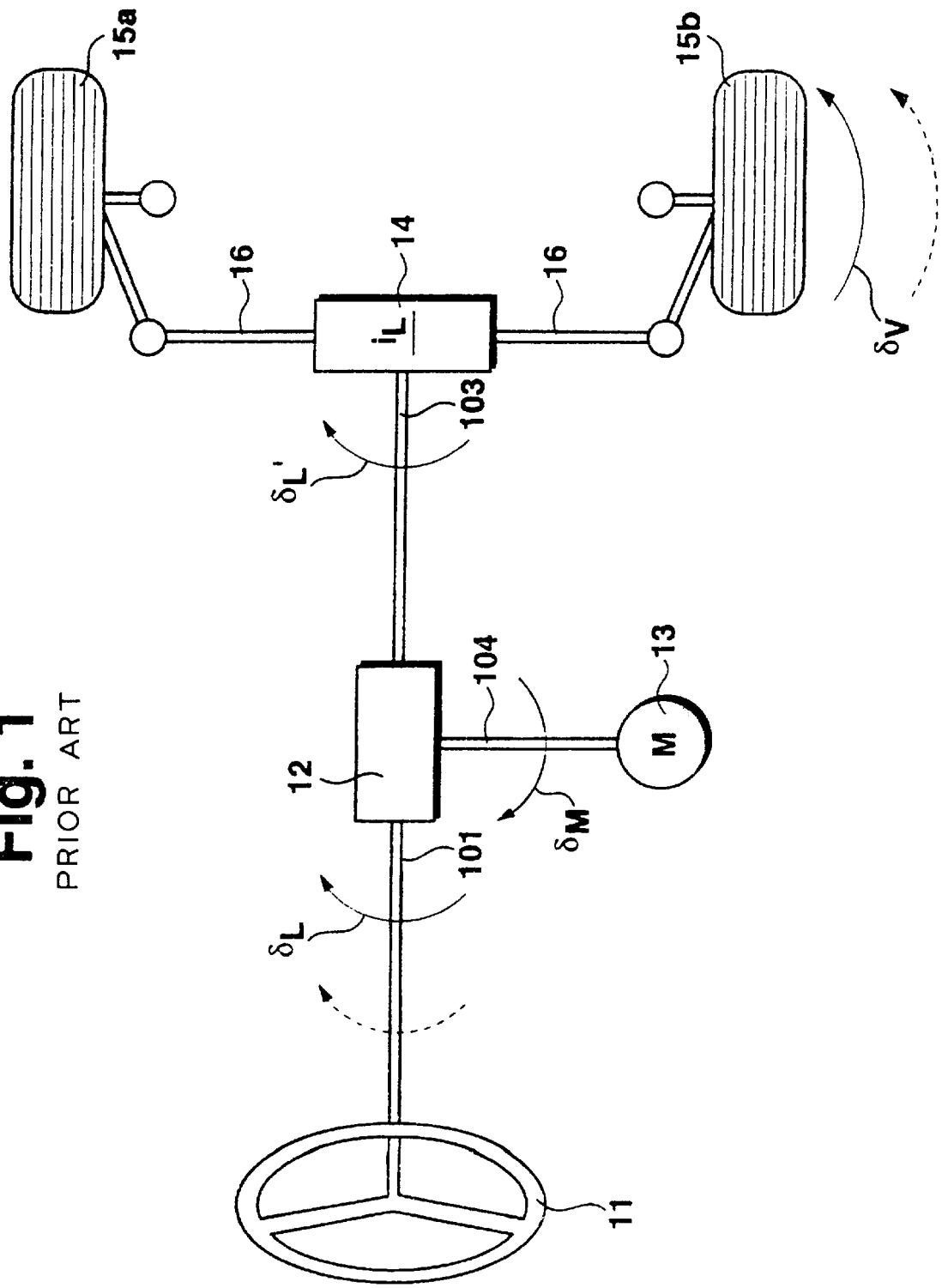
FIGS. 1 and 2 show schematically the steering system according to the prior art.
Figure 2:
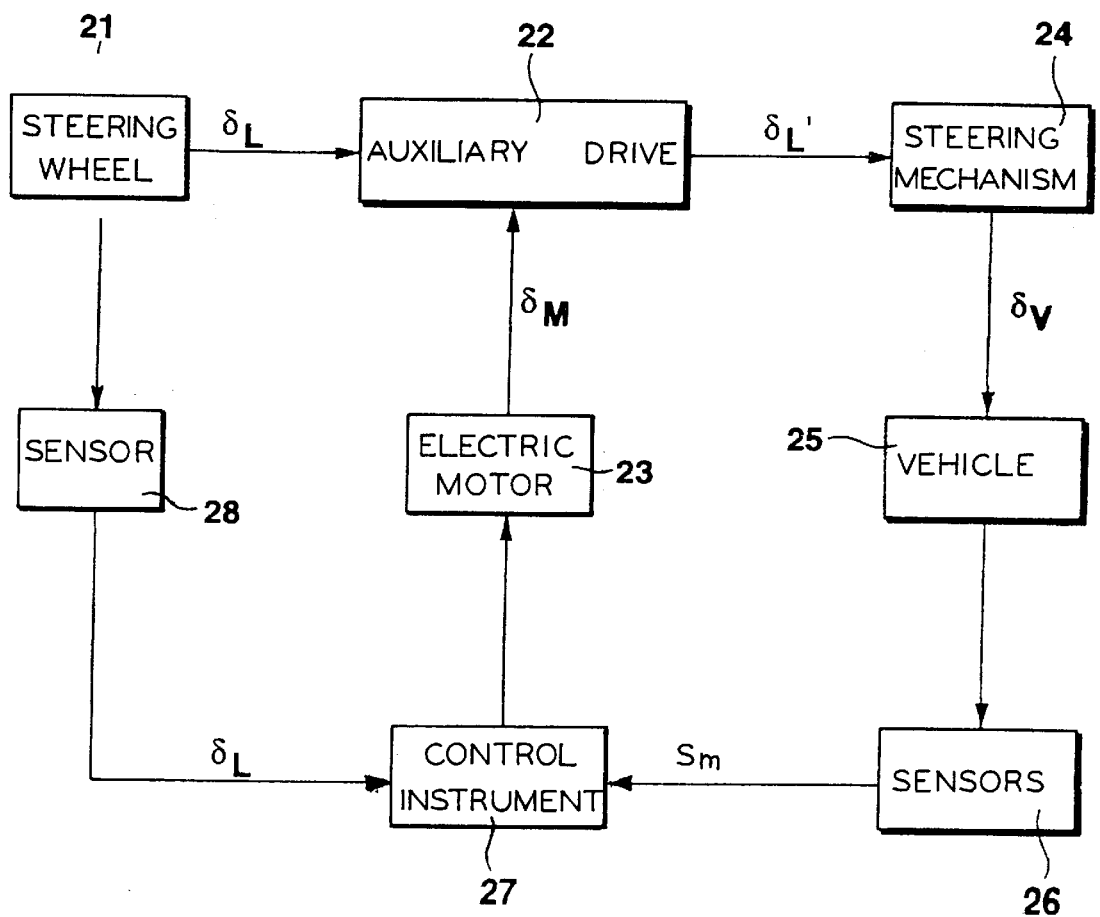

FIG. 1 and FIG. 2 by the reference symbols 11 or 21, respectively, show a steering wheel operable by the driver. By operating the steering wheel 11 or 21, the steering wheel angle $\delta_L$ is transmitted through the connection 101 to the auxiliary drive 12 or 22. At the same time the motor angle $\delta_M$ of the actuator 13 or 23 is fed through the connection 104 to the auxiliary drive 12 or 22; the actuator can be an electric motor. At the output of the auxiliary drive 12 or 22, the total motion $\delta_L'$ is transmitted through the connection 103 to the steering mechanism 14 or 24, which in turn impacts the steerable wheels 15a and 15b with the steering angle $\delta_V$ corresponding to the total angle $\delta_L'$ through the steering linkage 16. FIG. 2 also shows sensors 28 and 26, with the sensor 28 detecting the steering wheel angle $\delta_L$ and transmitting it to the control instrument 27, while sensors labeled 26 sense the motions of the vehicle 25 (e.g. yawing motions, transverse acceleration, vehicle speed, etc.) and transmit the corresponding signals Sm to the control instrument 27. The control instrument 27 determines a correcting variable u dependent on the detected steering wheel angle $\delta_L$ and on the vehicle motions, as the case may be, to control the actuator 13 or 23.

Figure 3:
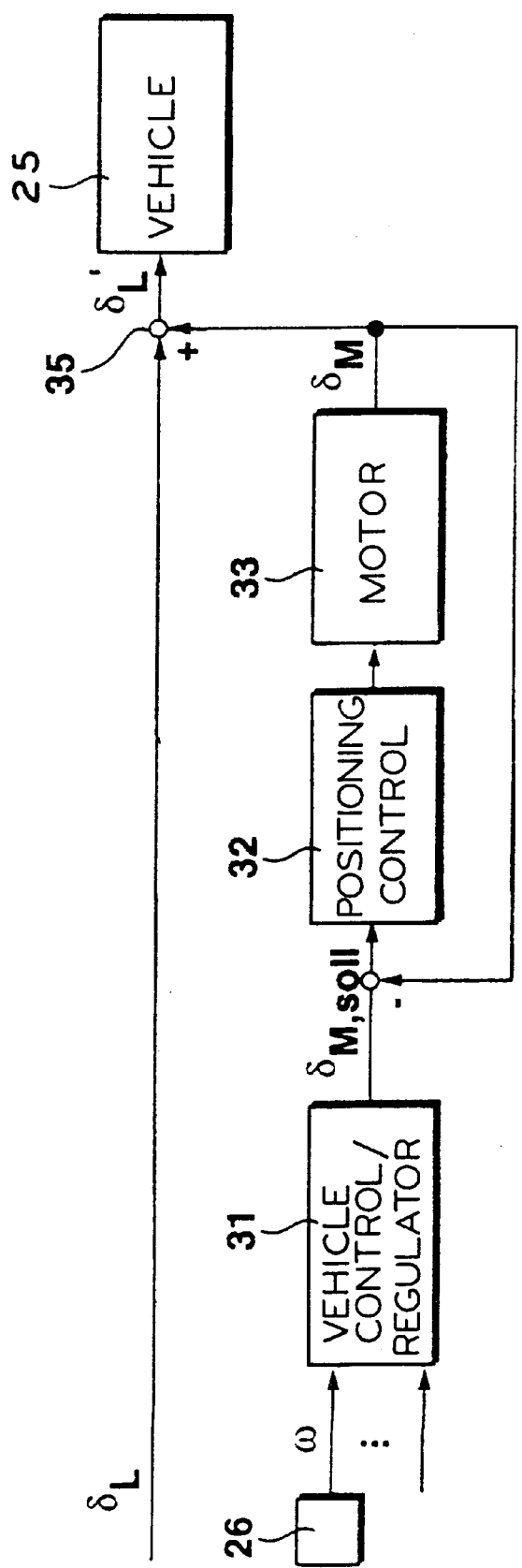
FIG. 3 illustrates the control and regulation strategy of a steering system according to FIGS. 1 and 2.

FIG. 3 with reference to a block diagram shows how the steering system functions while the vehicle is being driven. The added angle $\delta_M$ is set by a vehicle regulator or a control system 31 determining a desired value $\delta_{M,soll}$ for the added angle. This occurs dependent on the yawing angular velocity $\omega$ of the vehicle detected by the sensor 26. The desired value $\delta_{M,soll}$ is set by an underlying positioning control 32 and a current regulator, if applicable, through the motor 33, and is superimposed at Point 35 (auxiliary drive) on the steering wheel angle $\delta_L$ induced by the driver. Naturally it can also be provided that the desired value $\delta_{M,soll}$ for the added angle also includes components dependent on the steering wheel angle $\delta_L$, for example to assist driver steering.

Figure 4:
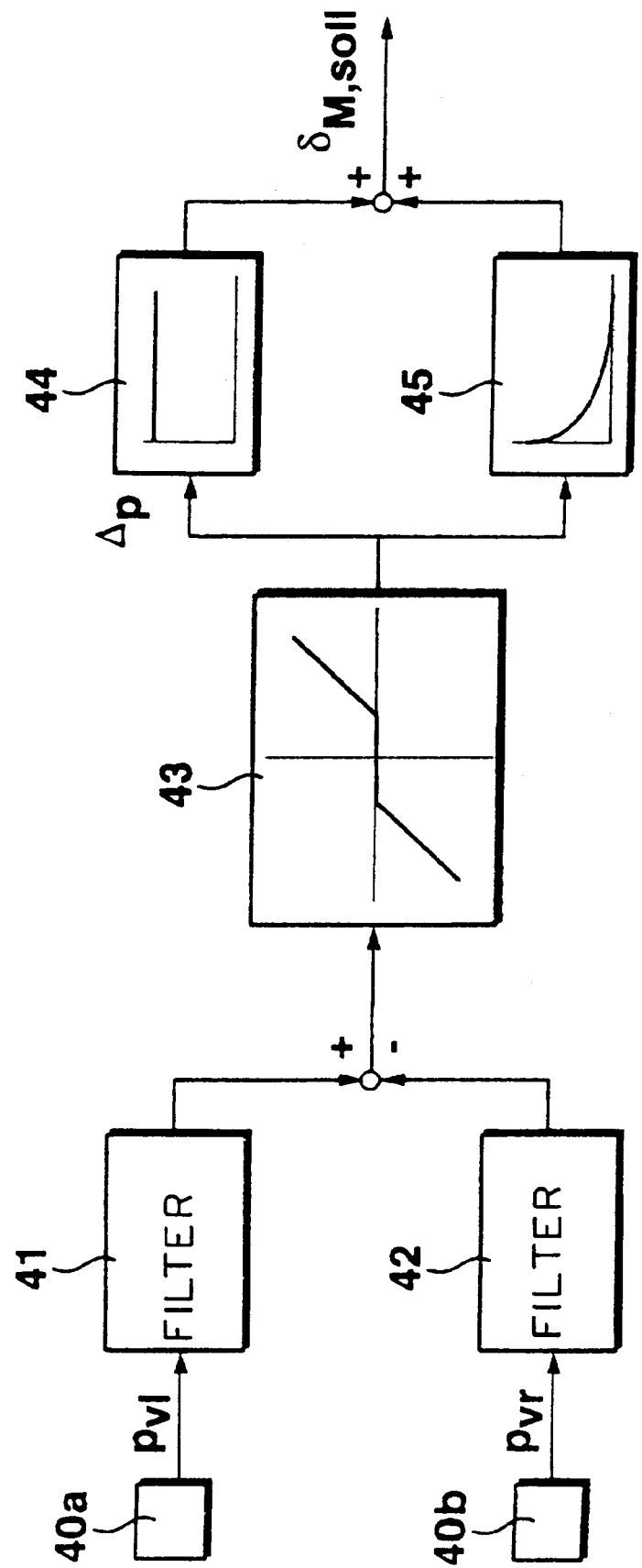
FIG. 4 shows a yawing moment compensator.

The determination of the desired value $\delta_{M,soll}$ in the case of $\mu$-split braking is shown in FIG. 4. In this case, therefore, a powerful braking process takes place (especially antilock braking) on a roadway that has very different coefficients of friction on the right and left sides of the vehicle. A yawing moment is produced in a known manner. With the yawing moment compensation illustrated in FIG. 4, the brake pressures $p_{vl}$ and $P_{vr}$ on the left and right front wheels are first either sensed directly or calculated from available measured data (e.g., valve opening times, bias pressure) (detectors 40a and 40b). These wheel brake pressures are then filtered in the filters 41 and 42 to blank out interfering effects. The difference between the brake pressures filtered in this way is then processed in Block 43 (proportional amplifier). The desired value $\delta_{M,soll}$ for the added angle is then determined from the difference thus processed by means of a constant amplification factor and a time-variable amplification factor (Blocks 44 and 45).

The problem already mentioned, that the brake pressure difference represents only an inaccurate measure of the yawing moment, which can be severely distorted in particular by different left and right tires, fading, nonuniform brake wear, antilock brake malfunction, or brake system failure, exists in the yawing moment compensation shown in FIG. 4.

Figure 5:
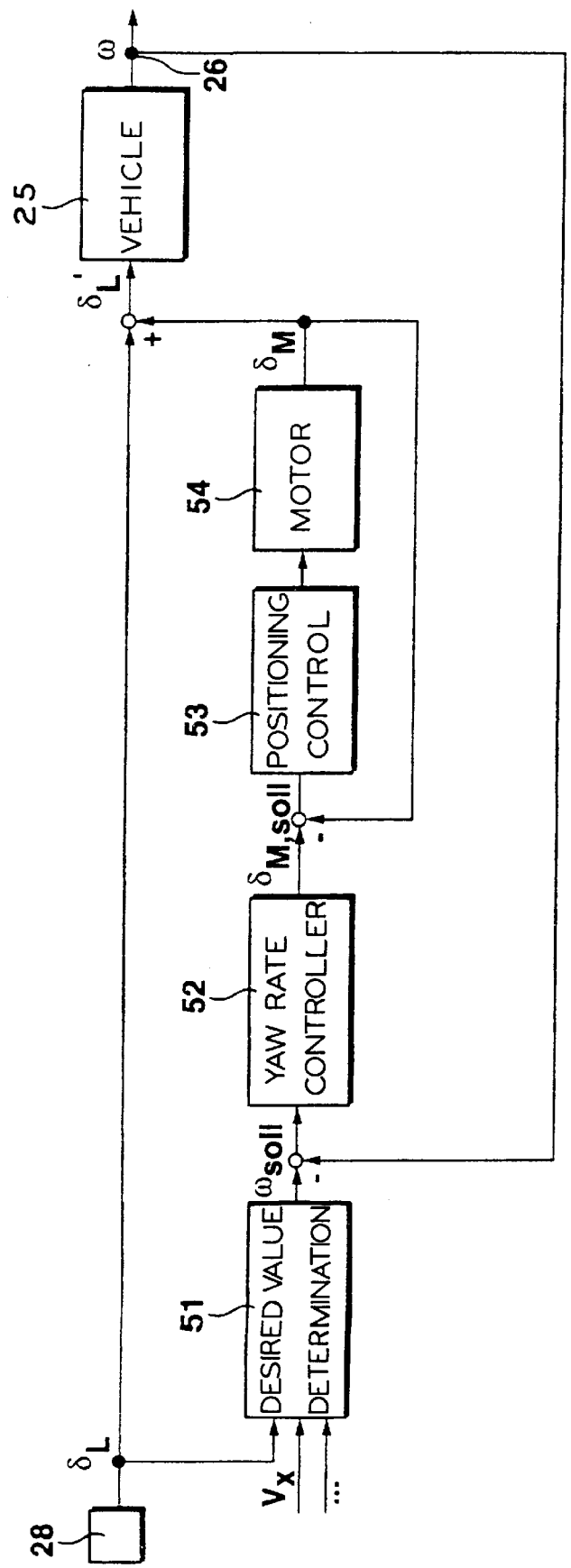

Another possibility consists of canceling the interference by a yaw rate controller according to FIG. 5. In this case a desired value $\omega_{soll}$ for the yaw rate is calculated (Block 51) from the vehicle speed $V_x$, the steering wheel angle $\delta_L$ (sensor 28), and possibly other variables, and is compared with the measured yaw rate $\omega$ of the vehicle. If it is found in the yaw rate controller 52 that the desired and measured values differ from one another, the yaw rate controller 52 determines a suitable desired value $\delta_{M,soll}$ for the added angle, to reduce the difference. The positioning control 53 and the motor 54 then correspond to Blocks 32 and 33 described in FIG. 3.

The use of a pure integral-control unit as a yaw rate controller is especially desirable for $\mu$-split braking. This means the control principle:

$$\delta_{M,soll} = K_I * \int (\omega_{soll} - \omega) dt$$

or $$d\,\delta_{M,soll} / dt = K_I * (\omega_{soll} - \omega)$$

$K_I$ in these equations is a constant amplification factor. As mentioned above, however, this control principle leads to frequent small interventions that are unnecessary and disturbing.

Figure 6:
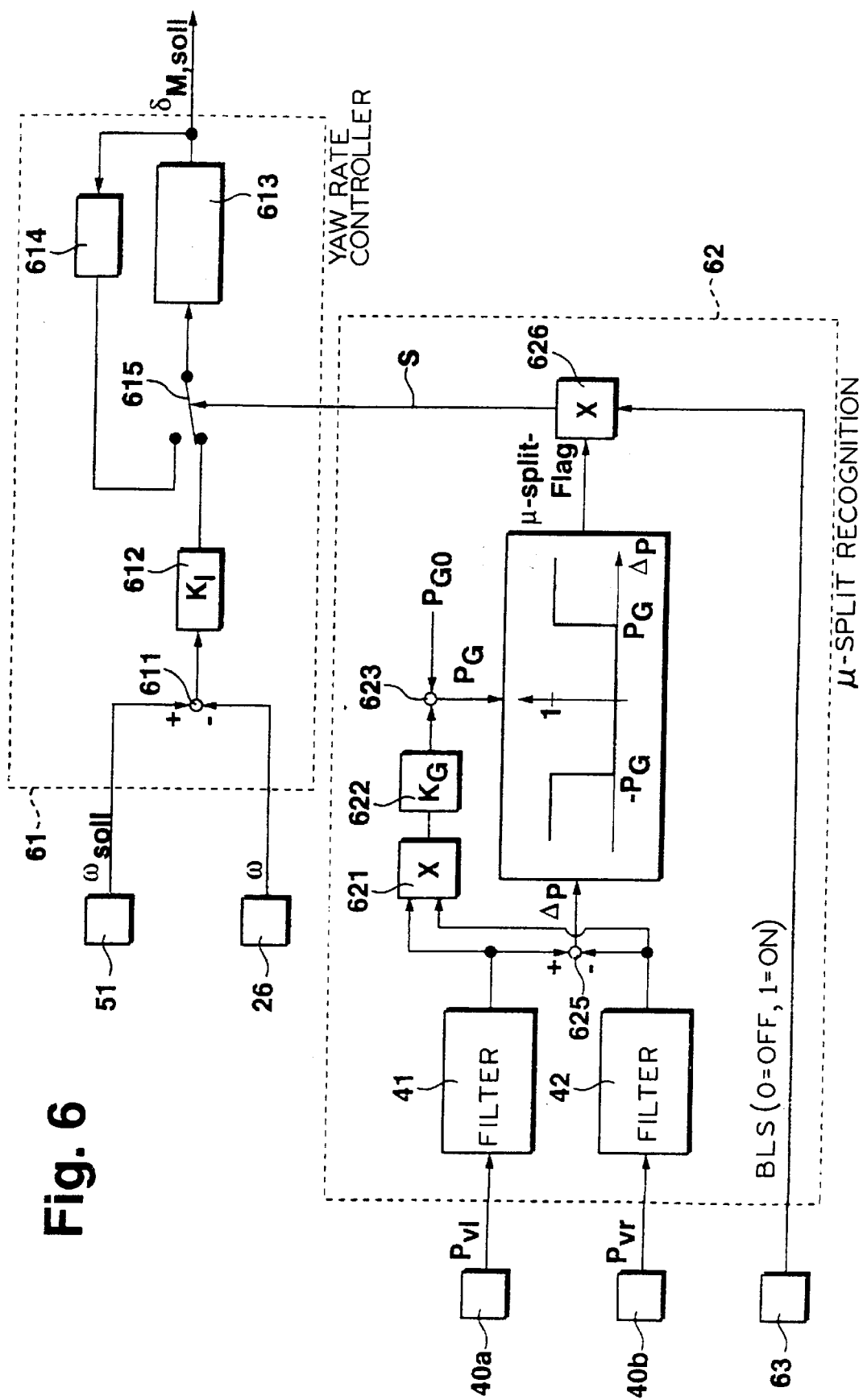
FIG. 6 shows the combination pursuant to the invention of the yaw rate control with $\mu$-split detection.

The yaw rate regulation described in FIG. 5 represents the basis for the combination illustrated in FIG. 6.

The instantaneous yaw rate ω detected by the sensor 26 and the corresponding desired value (Block 51, see FIG. 5) are transmitted to the yaw rate controller 61. The difference ($\omega_{soll}-\omega$) calculated in the linkage 611 is transmitted to the amplification stage 612 (integration amplification $K_I$). When the switch 615 assumes the position shown in FIG. 6, the difference ($\omega_{soll}-\omega$) is fed through the integrator 613 and processed to obtain the desired parameter $\delta_{M,soll}$ for the added angle $\delta_M$. When the switch 615, controllable by the signal S, shows the other position not shown in FIG. 6, the desired parameter $\delta_{M,soll}$ is applied through the amplification stage 614 to the input of the integrator 613.

The integrating yaw rate controller 61 is therefore switched in only in case of μ-split braking recognized by the μ-split detector 62. The switch 615 has the position shown in FIG. 6. Before μ-split braking is recognized, the correcting variable is $\delta_{M,soll}=0$. When μ-split braking is terminated, the added angle and the corresponding desired parameter $\delta_{M,soll}$ that then are still outstanding are returned to a value of zero; this is preferably accomplished with a first-order recovery curve. The switch 615 then has the position not shown in FIG. 6.

If the beginning of the trip is designated by the time t=0, the control principle is described by the following equations: for t=0:

$$\delta_{M,soll}(t=0) = 0;$$

for t>0:

$d\delta_{M,soll}(t)/dt = K_I*(\omega_{soll}-\omega)$, when μ-split braking prevails;

$d\delta_{M,soll}(t)/dt = -a*\delta_{M,soll}(t)$, when μ-split braking does not prevail.

In these equations, $K_I>0$ is a constant amplification that is approximately is great as the steering gear ratio $i_L$. a>0 is a constant factor, with 1/a being the time constant with which the added angle and the desired parameter $\delta_{M,soll}$ are restored after completion of μ-split braking. μ-split recognition 62 operates as follows:

When the brakes are actuated, which is determined by means of the brake light switch 63 (BLS signal), it is determined from the brake pressures $p_{vr}$ and $p_{vl}$ on the front wheels whether a μ-split situation prevails or not. The brake pressures in this case can be measured directly or can be estimated from other prevailing variables such as antilock brake system valve opening times and bias pressure.

After canceling out the interference effects in the filters 41 and 42, the brake pressure difference $\Delta p=(p_{vl}-p_{vr})$ is calculated at Point 625. If the brake pressure difference $\Delta p$ exceeds in magnitude a predetermined limit $P_G$, which may also depend on the overall pressure level, it is concluded that μ-split braking is involved. Thereupon the μ-split flag is set at one; otherwise it is zero.

The limit $P_G$ is matched to the overall pressure level by raising the constant value $P_{G0}$ by the product (Block 621) of the filtered brake pressures weighted by the constant factor $K_G$ (Block 622).

The μ-split flag is multiplied in Block 626 by the BLS value and logically AND-linked. If it is thus recognized that the instantaneous braking is on μ-split, then the switch 615 is brought into the position shown in FIG. 6, with the integral-control unit being switched in. When μ-split braking no longer prevails, the switch 615 is switched back and $\delta_{M,soll}$ is guided back to zero.

In addition to considering the wheel brake pressure differences as described, the ratio of the larger to the smaller of the brake pressures ($p_{vr}$, $p_{vl}$) of at least two wheel brakes on opposite sides of the vehicle can be evaluated.

The proposed switchable yaw rate controller makes possible numerous variants and extensions:

After the end of μ-split braking, the added angle is not brought back to zero with a time-delay curve, but on a linear slope, i.e. at the constant rate $\pm d\delta_{M,soll(0)}/dt$.

Restoration to the value of zero, i.e. the factor a or the rate $\pm d\delta_{M,soll(0)}/dt$, depends on the vehicle velocity.

When the vehicle is stopped, the added angle is not changed; if $\delta_M \neq 0$ or $\delta_{M,soll} \neq 0$, then the added angle is brought back to zero only when the vehicle starts to move again.

In μ-split recognition, the steering angle and the vehicle velocity or transverse acceleration are additionally taken into consideration, to be able better to differentiate between μ-split braking and curve braking.

Instead of using μ-split recognition according to FIG. 6, μ-split braking can be decided upon when the so-called μ-split factor $$P_{max} + P_{off}$$
$$P_{min} + P_{off}$$
$$P_2 * |a_y| + P_1 * |d\omega/dt| + P_0^{-1}$$

exceeds a predetermined limit. In this expression, $P_{max}$=max ($p_{vl},p_{vr}$), $P_{min}$=min ($p_{vl},p_{vr}$); $P_{off}$ is a constant offset and ay is the vehicle's transverse acceleration; $P_0$, $P_1$, and $P_2$ are constant parameters.

Instead of separate μ-split recognition, the μ-split flag that is usually present in a conventional antilock control unit is used.

The integral-control unit is also switched in in case of crosswind. The fact that crosswind prevails is detected by air pressure sensors at various positions on the body; cf. Tran, V. T.: Crosswind Feedforward Control—A Measure to Improve Vehicle Crosswind Behavior; Vehicle System Dynamics 23 (1993), pp. 165–205.

The switchable integral control unit is supplemented by other feedbacks, e.g. a proportional feedback of the yawing rate to damp the yawing motion, which of course can give rise to steering interventions at all times.

In summary, the following benefits of this invention can be set forth:

An integrating yaw rate controller for active steering intervention is presented, which is switched in only when an external disturbance of vehicle motion is detected. If there is no external disturbance, the added steering angle is returned to a value of zero.

In contrast to conventional yaw moment intervention, there is correct steering intervention also in case of nonuniform brake lining wear, fading, different tires right and left, antilock brake system malfunction, or brake system failure.

The disturbance can also be crosswind, which is recognized by air pressure sensors.

The switchable integral-control unit can be supplemented by other regulators or controls.

What is claimed is:

1. Method for operating a steering system for a motor vehicle having a braking system, brake lights, at least one steerable wheel, one steering actuator, and one auxiliary drive, the auxiliary drive superimposing the steering motion initiated by a driver of the vehicle and the motion initiated by the steering actuator to generate the steering motion of the steerable wheel, said method comprising:

detecting a yaw parameter representing the yawing motion of the vehicle;

detecting a braking parameter representing the condition of the vehicle, wherein the detected braking parameter is detected as a function of an actuation of the vehicle braking system;

determining the existence of a running condition as a function of the detected braking parameter;

generating a control signal only when said predetermined running condition prevails and said braking parameter is present, wherein said control signal is generated as a function of the detected yaw parameter; and controlling the steering actuator with the generated control signal to initiate an actuator motion.

2. Method according to claim 1, wherein the detected braking parameter represents a braking condition of the said vehicle in which a braking process takes place on a roadway with significantly different road friction on the different sides of the vehicle.

3. Method according to claim 1, wherein the braking parameter is detected dependent on one of the difference between the wheel brake pressures of at least two wheel brakes on different sides of the vehicle and the ratio of the larger to the smaller of the wheel brake pressure of at least two wheel brakes on different sides of the vehicle.

4. Method according to claim 3, wherein the detected braking parameter also depends on the steering motion initiated by a driver of the said vehicle, the vehicle speed, and a parameter representing transverse acceleration of the vehicle.

5. Method according to claim 1, wherein the detected braking parameter is detected dependent on the actuation of the brake lights.

6. Method according to claim 1, wherein a desired yawing motion value is determined for yawing motion of the vehicle, said yawing motion value dependent on one of the steering motion initiated by the driver of the vehicle and the detected vehicle speed, and wherein the control signal is calculated dependent on the difference between the detected yaw parameter and the desired yawing motion value.

7. Method according to claim 6 wherein one of the detected yaw parameter and said difference is integrated to calculate the control signal.

8. Method according to claim 1, further comprising detecting a crosswind parameter representing a crosswind effect on the said vehicle and determining the existence of said running condition as a function of the detected crosswind parameter.

9. Apparatus for operating a steering system for a motor vehicle with at least one steerable wheel, one steering actuator, and one auxiliary drive, with the auxiliary drive superimposing a steering motion initiated by a driver of the said vehicle and a motion initiated by the steering actuator to generate the steering motion of the steerable wheel, said apparatus comprising:

means for detecting a yaw parameter representing yawing motion of the said vehicle;

means for detecting a braking parameter representing the braking condition of the vehicle, wherein the detected braking parameter is detected as a function of an actuation of the vehicle braking system;

means for determining the existence of a running condition as a function of the detected braking parameter;

means for generating a control signal only when said predetermined running condition prevails and said braking parameter is present, wherein said control signal is generated as a function of said detected yaw parameter; and means for controlling the steering actuator to initiate a motion with said control signal.

10. Apparatus according to claim 9, wherein the detected braking parameter is a function of one of the difference between the wheel brake pressures of at least two wheel brakes on different sides of the said vehicle and the ratio of the larger to the smaller of the wheel brake pressures of at least two wheel brakes on different sides of the said vehicle.

11. Method for operating a steering system for a motor vehicle having a braking system, brake lights, at least one steerable wheel, one actuator, and one auxiliary drive, the auxiliary drive superimposing the steering motion initiated by a driver of the vehicle and the motion initiated by the actuator to generate the steering motion of the steerable wheel, said method comprising:

detecting a yaw parameter representing the yawing motion of the vehicle;

generating a control signal when a predetermined running condition prevails, wherein said control signal is generated as a function of the detected yaw parameter;

controlling the actuator with the generated control signal to initiate an actuator motion;

detecting a braking parameter representing the braking condition of the said vehicle;

determining the existence of the running condition as a function of the detected braking parameter; and wherein, after determining the existence of the running condition, the control signal is decreased with time to a predetermined value, the decrease with time being accomplished on one of a linear slope and a first-order time delay curve, and wherein the decrease with time depends on the vehicle speed.

* * * * *

UNITED STATES PATENT AND TRADEMARK OFFICE
CERTIFICATE OF CORRECTION

PATENT NO. : 6,085,860
DATED : July 11, 2000
INVENTOR(S) : MATTHIAS HACKL and WOLFGANG KRAEMER It is certified that error appears in the above-identified patent and that said Letters Patent are hereby corrected as shown below:

In Claim 1, Column 7, Line 5, after "the" insert --braking--

In Claim 3, Column 7, Line 27, delete "pressure" and substitute therefor --pressures--

Signed and Sealed this

Third Day of April, 2001

Attest:

NICHOLAS P. GODICI

*Attesting Officer*  *Acting Director of the United States Patent and Trademark Office*